US012665147B2

(12) United States Patent
Shi et al.

(10) Patent No.: US 12,665,147 B2
(45) Date of Patent: Jun. 23, 2026

(54) ROTARY OPERATOR AND ROTARY SWITCH

(71) Applicants: Huawei Digital Power Technologies Co., Ltd., Shenzhen (CN); Shanghai Liangxin Electrical Co., Ltd., Shanghai (CN)

(72) Inventors: Jian Shi, Shanghai (CN); Chen Song, Shanghai (CN); Yang Chang, Shanghai (CN)

(73) Assignees: Huawei Digital Power Technologies Co., Ltd., Shenzhen (CN); Shanghai Liangxin Electrical Co., Ltd., Shanghai (CN)

( * ) Notice: Subject to any disclaimer, the term of this patent is extended or adjusted under 35 U.S.C. 154(b) by 551 days.

(21) Appl. No.: 18/309,629

(22) Filed: Apr. 28, 2023

(65) Prior Publication Data

US 2023/0268149 A1 Aug. 24, 2023

Related U.S. Application Data

(63) Continuation of application No. PCT/CN2021/119490, filed on Sep. 22, 2021.

(30) Foreign Application Priority Data

Oct. 30, 2020 (CN) ........................ 202011198239.6

(51) Int. Cl.
*H01H 19/14* (2006.01)
*H01H 19/04* (2006.01)

(52) U.S. Cl.
CPC ........... *H01H 19/14* (2013.01); *H01H 19/04* (2013.01)

(58) Field of Classification Search
CPC ...... H01H 19/14; H01H 19/11; H01H 19/585; H01H 19/58; H01H 19/62; H01H 19/635;
(Continued)

(56) References Cited

U.S. PATENT DOCUMENTS 5,861,591 A * 1/1999 Wegener ................ H01H 83/04 200/336
2019/0287741 A1 9/2019 Taaffe et al.

FOREIGN PATENT DOCUMENTS

CN 206602084 U 10/2017
CN 112164641 A 1/2021
(Continued)

*Primary Examiner* — Ahmed M Saeed
(74) *Attorney, Agent, or Firm* — Leydig, Voit & Mayer, Ltd.

(57) ABSTRACT

The present disclosure provides a rotary operator and a rotary switch. The rotary operator includes a handle, a fastening base, and a pressing component. The fastening base is provided with an accommodation cavity. A transmission end of the handle is inserted in the accommodation cavity and is capable of relatively rotating in the accommodation cavity. The pressing component is sleeved on the transmission end of the handle and is slidably connected to the fastening base. The handle is pushed to move along an axis of the accommodation cavity, so that the pressing component moves relative to the fastening base to be in contact with or separated from a tripper of a circuit breaker. The rotary operator can reset the tripper of the circuit breaker easily after a switching operation is completed.

14 Claims, 8 Drawing Sheets

(58) Field of Classification Search
CPC ...... H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01
See application file for complete search history.

(56) References Cited

FOREIGN PATENT DOCUMENTS

| | | | |
|---|---|---|---|
| CN | 112216567 | A | 1/2021 |
| CN | 213401054 | U | 6/2021 |
| CN | 213401064 | U | 6/2021 |

* cited by examiner

ROTARY OPERATOR AND ROTARY SWITCH

CROSS-REFERENCE TO RELATED APPLICATION

This application is a continuation of International Application No. PCT/CN2021/119490, filed on Sep. 22, 2021, which claims priority to Chinese Patent Application No. 202011198239.6, filed on Oct. 30, 2020. The disclosures of the aforementioned applications are hereby incorporated by reference in their entireties.

FIELD

The present disclosure relates to the field of switch technologies, and in particular, to a rotary operator and a rotary switch.

BACKGROUND

The term "switch" is defined as a component for on and off control. A switch is a component that can disconnect a circuit, and interrupt an electric current or divert the electric current to another circuit. The most common switch is a manually operated electromechanical device with one or more contacts. A "closed" switch means that the contact is connected to a circuit to allow an electric current to flow in the circuit. An "open" switch means that the contact is not connected to the circuit, and no electric current is allowed to flow in the circuit. The development history of the switches has evolved from a knife switch that needs to be operated manually to an intelligent switch that is applied to various large-scale electrical control devices. The switches have more functions with higher safety. As a common switch, a rotary switch locks a rotary operator in a specific position that corresponds to a specific state of a rotary operation apparatus to prevent an unauthorized operation on the rotary operation apparatus.

With the development of technologies, especially in a photovoltaic system, a remote switching function of the rotary switch is gradually in demand. For example, when a photovoltaic panel is on fire, it is required to remotely control a circuit to be disconnected. Generally, before a subsequent switching action is performed, it is required to reset the rotary switch after the remote switching. In the conventional technology, to facilitate reset of a tripper of a circuit breaker to avoid affecting normal switching-off of the circuit breaker, it is required to provide a hole on a mounting panel, so that a reset button of the tripper is driven at the hole. Therefore, the reset button controls the reset of the tripper. However, this manner of controlling the reset by using the reset button not only occupies panel space, but also causes deterioration of sealing performance of the rotary switch and a cabinet.

SUMMARY

An objective of the present disclosure is to provide a rotary operator and a rotary switch, which can facilitate reset of a tripper of a circuit breaker after a switching operation is completed.

Embodiments of the present disclosure are implemented as follows.

According to one aspect of the present disclosure, a rotary operator is provided. The rotary operator includes a handle, a fastening base, and a pressing component. The fastening base is provided with an accommodation cavity. A transmission end of the handle is inserted into the accommodation cavity and is capable of relatively rotating in the accommodation cavity. The pressing component is sleeved on the transmission end of the handle and is slidably connected to the fastening base. The handle is pushed to move along an axis of the accommodation cavity, so that the pressing component moves relative to the fastening base to be in contact with or be separated from the tripper. The rotary operator can easily enable the tripper of the circuit breaker to be reset after a switching operation is completed.

According to an embodiment of the present disclosure, the pressing component includes a pressure-bearing component and a pressing rod. The pressure-bearing component is sleeved on the transmission end of the handle. The fastening base is provided with an avoidance slot fitting the pressing rod. One end of the pressing rod is connected to the pressure-bearing component, and the other end extends outward through the avoidance slot. The pressing rod is configured to act on the tripper.

In an embodiment of the present disclosure, the rotary operator further includes a lever support. The lever support and the pressing rod are connected to each other to jointly form a lever structure. The handle is pushed to move along the axis of the accommodation cavity to act on the pressure-bearing component, so that the pressing component is in contact with or is separated from the tripper of the circuit breaker under action of the lever support.

In an embodiment of the present disclosure, an action point between the pressure-bearing component and the handle, and an action point between the tripper and the pressing rod are located on a same side of the lever support.

In an embodiment of the present disclosure, an action point between the pressure-bearing component and the handle, and an action point of the tripper and the pressing rod are respectively located on two opposite sides of the lever support.

In an embodiment of the present disclosure, there are two avoidance slots. The two avoidance slots are separately disposed on the fastening base. The pressing rod includes a first limiting rod and a second limiting rod that are separately connected to the pressure-bearing component. The first limiting rod and the second limiting rod are engaged with the two avoidance slots in a one-to-one correspondence. The second limiting rod is configured to be in contact with or be separated from the tripper of the circuit breaker.

In an embodiment of the present disclosure, the handle further includes a driving end connected to the transmission end. The driving end is configured to facilitate holding.

In an embodiment of the present disclosure, a sealing ring is sleeved on an outer peripheral wall of the transmission end, and the sealing ring is located between the transmission end and the fastening base.

In an embodiment of the present disclosure, a gasket is further sleeved on the outer peripheral wall of the transmission end, and the gasket is located on a side that is of the sealing ring and that is away from the pressing component.

In an embodiment of the present disclosure, the transmission end further includes a baffle connected to an outer peripheral wall of the transmission end, and the baffle is configured to restrict the handle from being detached from the accommodation cavity.

In an embodiment of the present disclosure, a limiting groove is disposed on a side that is of the fastening base and that is away from the pressing component. A limiting component is disposed on the handle corresponding to the limiting groove. When the handle is pushed to drive the pressing component move toward the tripper, the limiting component is engaged with the limiting groove.

In an embodiment of the present disclosure, the rotary operator further includes an elastic component. The elastic component acts between the fastening base and the handle, and is configured to drive the handle move along the axis of the accommodation cavity to generate a movement trend of being detached from the accommodation cavity.

In an embodiment of the present disclosure, the fastening base is further provided with a first protrusion extending toward the handle from an inner wall of the accommodation cavity. The handle further includes a second protrusion, and the second protrusion is disposed on an outer peripheral wall of the handle. One end of the elastic component abuts against the first protrusion, and the other end abuts against the second protrusion.

According to another aspect of the present disclosure, a rotary switch is provided. The rotary switch includes a tripper and the foregoing rotary operator. The rotary operator is configured to act on the tripper to reset the tripper. The rotary switch can reset the tripper of the circuit breaker easily after a switching operation is completed.

Beneficial effects of the present disclosure include:

the rotary operator provided in the present disclosure includes a handle, a fastening base, and a pressing component. The fastening base is provided with an accommodation cavity. A transmission end of the handle is inserted into the accommodation cavity and is capable of relatively rotating in the accommodation cavity. The pressing component is sleeved on the transmission end of the handle and is slidably connected to the fastening base. The handle is pushed to move along an axis of the accommodation cavity, so that the pressing component moves relative to the fastening base to be in contact with or be separated from the tripper. In this way, in a use process, the handle may be pushed, so that the transmission end of the handle acts on the pressing component to drive the pressing component to move relative to the fastening base. Therefore, the pressing component approaches or is away from the tripper of a circuit breaker, and the pressing component thus acts on the tripper or stops acting on the tripper. When acting on the tripper, the pressing component may control the tripper to be reset, so that the tripper controls an operating mechanism of the circuit breaker to be reset. Therefore, the circuit breaker can be normally switched off or switched on. Then, after the tripper is reset, the transmission end of the handle may cooperate with the circuit breaker, so that the rotary operator in the present disclosure controls the circuit breaker to be normally switched off/on. In this way, the rotary operator in the present disclosure can reset the tripper of the circuit breaker easily after the switching operation is completed, to prepare for next switching-off or switching-on. Therefore, a switching-off or switching-on operation does not fail.

BRIEF DESCRIPTION OF DRAWINGS

To describe the technical solutions in embodiments of the present disclosure more clearly, the following briefly describes the accompanying drawings used for describing embodiments. It should be understood that the accompanying drawings show only some embodiments of the present disclosure, and therefore should not be considered as a limitation on the scope. A person of ordinary skill in the art may still derive other related drawings from these accompanying drawings without creative efforts.

Figure 1:
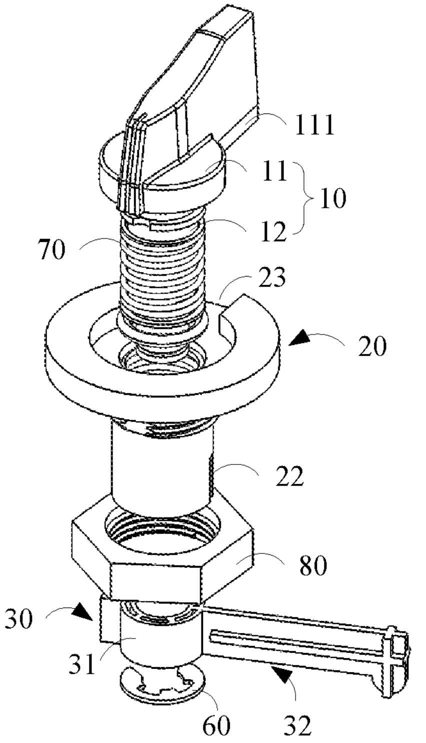
FIG. 1 is a schematic diagram 1 of a structure of a rotary operator according to an embodiment of the present disclosure.

Reference numerals: 10-handle; 11-driving end; 111-limiting component; 12-transmission end; 121-output hole; 122-limiting part; 13-second protrusion; 20-fastening base; 21-accommodation cavity; 22-avoidance slot; 23-limiting groove; 24-first protrusion; 30-pressing component; 31-pressure-bearing component; 32-pressing rod; 321-first limiting rod; 322-second limiting rod; 40-sealing ring; 50-gasket; 60-baffle; 70-elastic component; 80-fastening nut; 90-tripper; and 91-reset button.

DESCRIPTION OF EMBODIMENTS

To make the objectives, technical solutions, and advantages of embodiments of the present disclosure clearer, the following clearly describes the technical solutions in embodiments of the present disclosure with reference to the accompanying drawings. It is clear that the described embodiments are some but not all of embodiments of the present disclosure. Generally, components of embodiments of the present disclosure described and shown in the accompanying drawings herein may be arranged and designed in various configurations.

Therefore, the following detailed descriptions of embodiments of the present disclosure provided in the accompanying drawings are not intended to limit the scope of the present disclosure that claims protection, but merely to represent selected embodiments of the present disclosure. All other embodiments obtained by a person of ordinary skill in the art based on embodiments of the present disclosure without creative efforts shall fall within the protection scope of the present disclosure.

It should be noted that similar reference numerals and letters represent similar items in the following accompanying drawings, and therefore, once an item is defined in one of the accompanying drawings, no further definition or explanation is required in the following accompanying drawings.

In the description of the present disclosure, it should be noted that an orientation or position relationship indicated by terms "center", "up", "down", "left", "right", "vertical", "horizontal", "inside", "outside", and the like is an orientation or position relationship based on the accompanying drawings, or an orientation or position relationship of placing a product of the present disclosure when the product is in use. The terms are merely for ease of description and simplification of the present disclosure, instead of indicating or implying that a specified apparatus or element must have a specific direction and be constructed and operated in a specific direction. Therefore, the terms cannot be construed as a limitation on the present disclosure. In addition, the terms "first", "second", "third", and the like are merely used for differentiation and description, and cannot be understood as an indication or implication of relative importance.

In addition, terms such as "horizontal" and "vertical" do not mean that a component is required to be absolutely horizontal or hung, but may be slightly tilted. For example, "horizontal" only means that a direction is more horizontal than "vertical". It does not mean that the structure must be completely horizontal, but may be slightly tilted.

In the description of the present disclosure, it should be further noted that, unless otherwise specified and limited, the terms "setting", "installation", "connected to", and "connection" shall be understood in a broad sense. For example, the "connection" may be fastened connection, detachable connection, or integrated connection. The "connection" may be mechanical connection, or electrical connection. The "connection" may be direct connection, or indirect connection through an intermediate medium, or internal connection of two components. A person of ordinary skill in the art may understand specific meanings of the foregoing terms in the present disclosure according to specific circumstances.

With reference to FIG. 1 to FIG. 6, this embodiment provides a rotary operator. The rotary operator includes a handle 10, a fastening base 20, and a pressing component 30. The fastening base 20 is provided with an accommodation cavity 21. A transmission end 12 of the handle 10 is inserted into the accommodation cavity 21 and is capable of relatively rotating in the accommodation cavity 21. The pressing component 30 is sleeved on the transmission end 12 of the handle 10 and is slidably connected to the fastening base 20. The handle 10 is pushed to move along an axis of the accommodation cavity 21, so that the pressing component 30 moves relative to the fastening base 20 to be in contact with or be separated from a tripper 90 of a circuit breaker. The rotary operator may easily enable the tripper 90 of the circuit breaker to be reset after a switching operation is completed.

Figure 9:
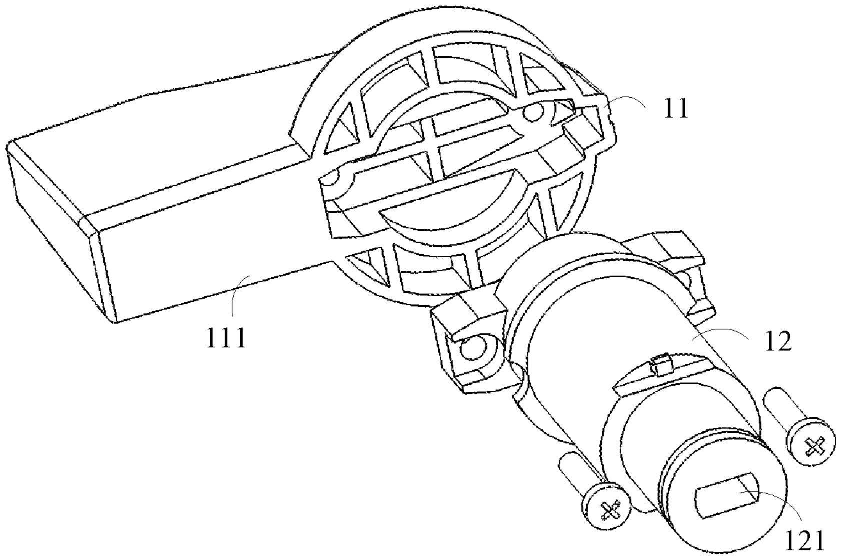
FIG. 9 is a schematic diagram of a structure of a handle according to an embodiment of the present disclosure.

In this embodiment, the handle 10 rotates, so that the transmission end 12 of the handle 10 cooperates with the circuit breaker to implement switching-off or switching-on of the circuit breaker. For example, in an embodiment, with reference to FIG. 3 and FIG. 9, the transmission end 12 of the handle 10 is provided with an output hole 121. The output hole 121 is configured to cooperate with the circuit breaker to drive the circuit breaker to be switched off or switched on.

It should be noted that, in this embodiment, the transmission end 12 of the handle 10 is inserted into the accommodation cavity 21 of the fastening base 20. The fastening base 20 does not radially restrict the transmission end 12, and the transmission end 12 is capable of rotating relative to the fastening base 20. In this way, the transmission end 12 of the handle 10 may control the circuit breaker.

Figure 2:
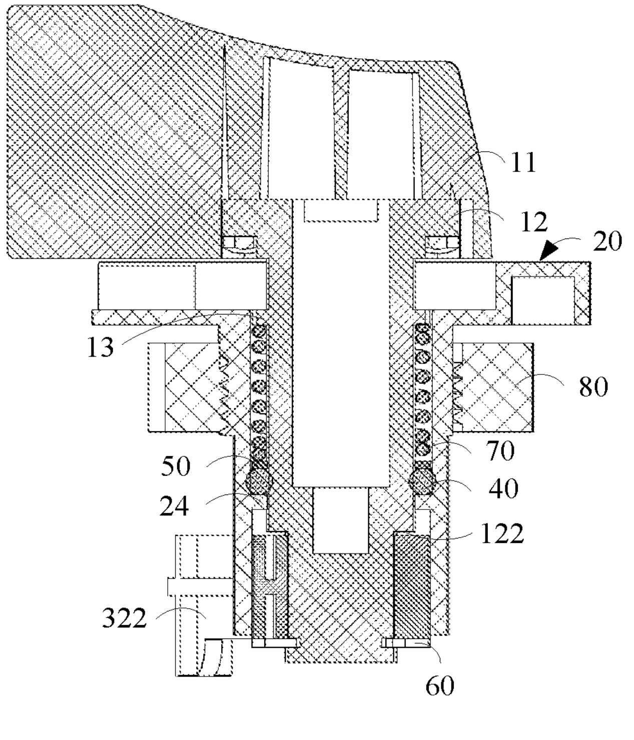
FIG. 2 is a schematic diagram 2 of a structure of a rotary operator according to an embodiment of the present disclosure.
Figure 3:
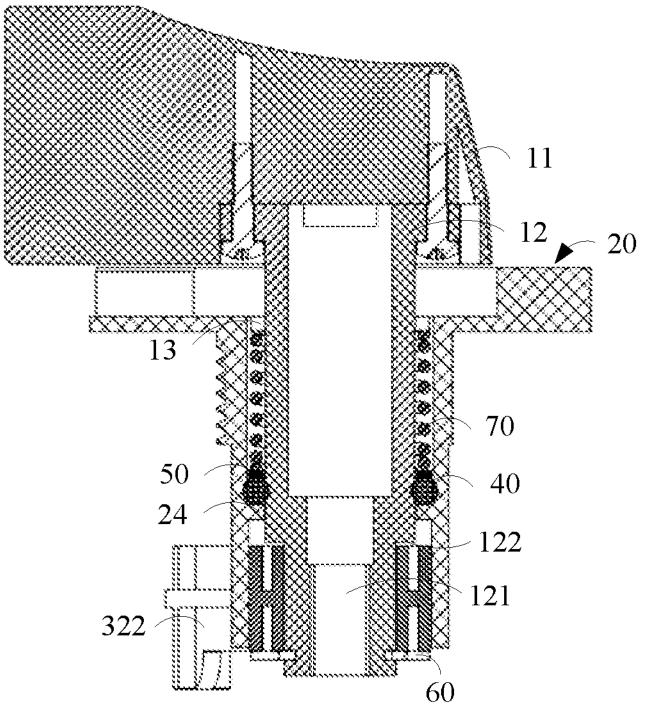
FIG. 3 is a schematic diagram 3 of a structure of a rotary operator according to an embodiment of the present disclosure.

In addition, in this embodiment, the pressing component 30 is sleeved on the transmission end 12 of the handle 10 and is slidably connected to the fastening base 20. The handle 10 is pushed to move along the axis of the accommodation cavity 21 (when a direction in FIG. 2 or FIG. 3 is used as an example, the handle 10 moves in a vertical direction). The transmission end 12 of the handle 10 may act on the pressing component 30, so that the pressing component 30 slides relative to the fastening base 20 (when the direction in FIG. 2 or FIG. 3 is used as an example, the pressing component 30 slides in a vertical direction). In this way, the pressing component 30 may approach or be away from the tripper 90 to implement contact with or separation from the tripper 90. It should be understood that, contact herein means that the pressing component 30 may act on the tripper 90, so that the tripper 90 is reset. Similarly, separation herein means that the pressing component 30 may not act on the tripper 90.

It should be understood that, further with reference to FIG. 4 to FIG. 7, for example, in another embodiment, when the tripper 90 is controlled by using a reset button 91, the pressing component 30 correspondingly acts on the reset button 91 of the tripper 90. The reset button 91 drives the tripper 90, so that the tripper 90 is reset. In addition, in another embodiment, the pressing component 30 may also reset the tripper 90 by pushing or pulling the reset button 91.

According to the foregoing description, the handle 10 is pushed so that the handle 10 moves along an axis direction of the accommodation cavity 21, so that the pressing component 30 moves relative to the fastening base 20. That is, the transmission end 12 of the handle 10 may drive the pressing component 30 to move relative to the fastening base 20. For example, the transmission end 12 of the handle 10 is configured in a form of a stepped shaft, and the pressing component 30 is sleeved on the stepped shaft, so that a shaft shoulder of the stepped shaft restricts an axial movement of the pressing component 30 along the transmission end 12.

In conclusion, the rotary operator provided in the present disclosure includes the handle 10, the fastening base 20, and the pressing component 30. The fastening base 20 is provided with the accommodation cavity 21. The transmission end 12 of the handle 10 is inserted into the accommodation cavity 21 and is capable of relatively rotating in the accommodation cavity 21. The pressing component 30 is sleeved on the transmission end 12 of the handle 10 and is slidably connected to the fastening base 20. The transmission end 12 of the handle 10 is configured to rotate in cooperation with the circuit breaker to implement switching-off or switching-on. The handle 10 is pushed to move along the axis of the accommodation cavity 21, so that the pressing component 30 moves relative to the fastening base 20 to be in contact with or be separated from the tripper 90 of the circuit breaker. In this way, in a use process, the handle 10 may be pushed, so that the transmission end 12 of the handle 10 acts on the pressing component 30 to drive the pressing component 30 to move relative to the fastening base 20. Therefore, the pressing component 30 approaches or is away from the tripper 90 of the circuit breaker, and the pressing component 30 acts on the tripper 90 or stops acting on the tripper 90. When acting on the tripper 90, the pressing component 30 may control the tripper 90 to be reset, so that the tripper 90 controls an operating mechanism of the circuit breaker to be reset. Therefore, the tripper 90 can be normally switched off or switched on. Then, after the tripper 90 is reset, the transmission end 12 of the handle 10 may cooperate with the circuit breaker, so that the rotary operator in the present disclosure controls the circuit breaker to be normally switched off/on. In this way, the rotary operator in the present disclosure can easily enable the tripper 90 of the circuit breaker to be reset after the switching operation is completed, to prepare for next switching-off or switching-on. Therefore, a switching-off or switching-on operation does not fail.

Figure 10:
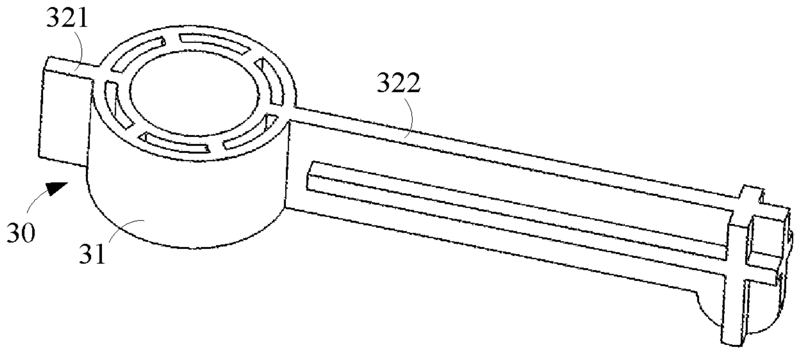
FIG. 10 is a schematic diagram of a structure of a pressing component according to an embodiment of the present disclosure.

In a possible implementation, with reference to FIG. 10, the pressing component 30 includes a pressure-bearing component 31 that is sleeved on the transmission end 12 of the handle 10, and a pressing rod 32 that is arranged to extend toward the fastening base 20 from the pressure-bearing component 31. The fastening base 20 is provided with an avoidance slot 22 fitting the pressing rod 32. The pressing rod 32 is slidably connected to the fastening base 20 by using the avoidance slot 22. In this way, the transmission end 12 of the handle 10 may act on the pressure-bearing component 31, so that the pressure-bearing component 31 moves relative to the fastening base 20. Due to a connection relationship between the pressure-bearing component 31 and the pressing rod 32, when the pressure-bearing component 31 moves relative to the fastening base 20, the pressing component 30 may move in the avoidance slot 22 at the same time to approach or be away from the tripper 90.

It should be noted that, in the present disclosure, in an embodiment, with reference to FIG. 1 to FIG. 3, the fastening base 20 may be an integrated part. In another embodiment, with reference to FIG. 4 to FIG. 6, the fastening base may be divided into two parts, that is, including an upper base (which may be fastened to a platform surface) and a lower base (which may be fastened to a housing of a circuit breaker) that are separated from each other.

Figure 11:
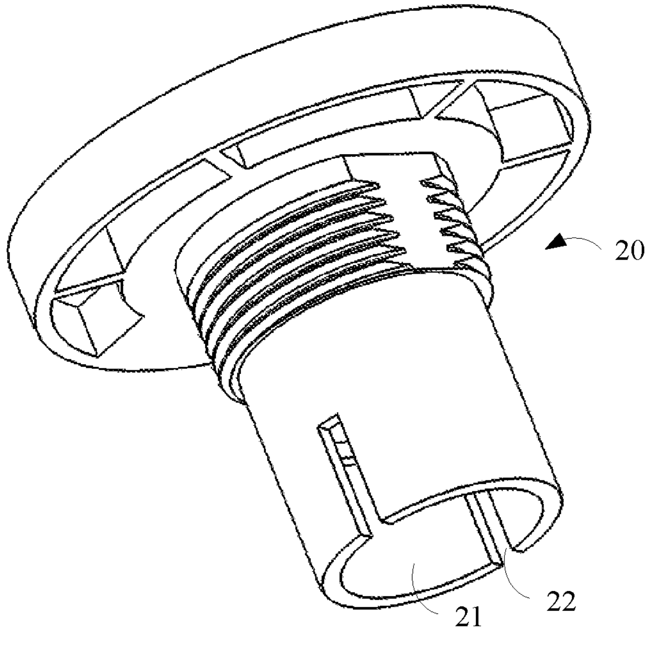
FIG. 11 is a schematic diagram of a structure of a fastening base according to an embodiment of the present disclosure.
Figure 14:
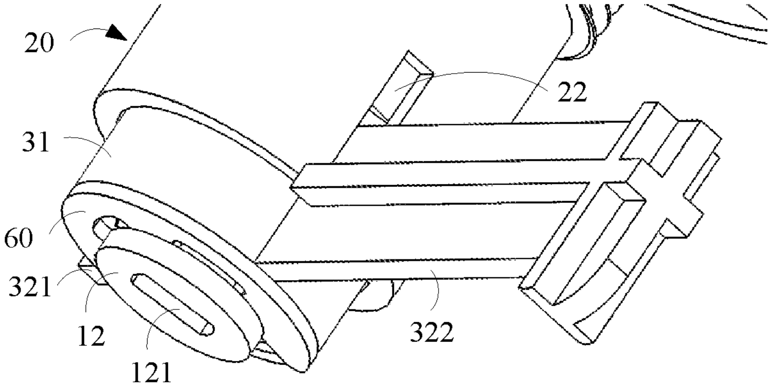
FIG. 14 is a diagram of a cooperative relationship between a pressing component and a fastening base according to an embodiment of the present disclosure.

With reference to FIG. 1 to FIG. 3, when the fastening base 20 is an integrated part, reference may be made to FIG. 11 and FIG. 14. In this case, when the handle 10 drives the tripper 90 to be reset, the pressing component 30 is gradually away from the fastening base 20, and the pressing rod 32 is gradually away from the avoidance slot 22.

Figure 4:
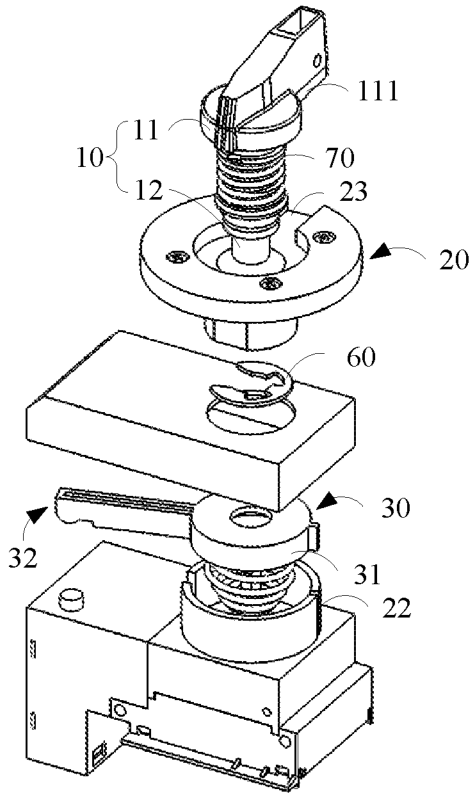
FIG. 4 is a schematic diagram 4 of a structure of a rotary operator according to an embodiment of the present disclosure.
Figure 5:
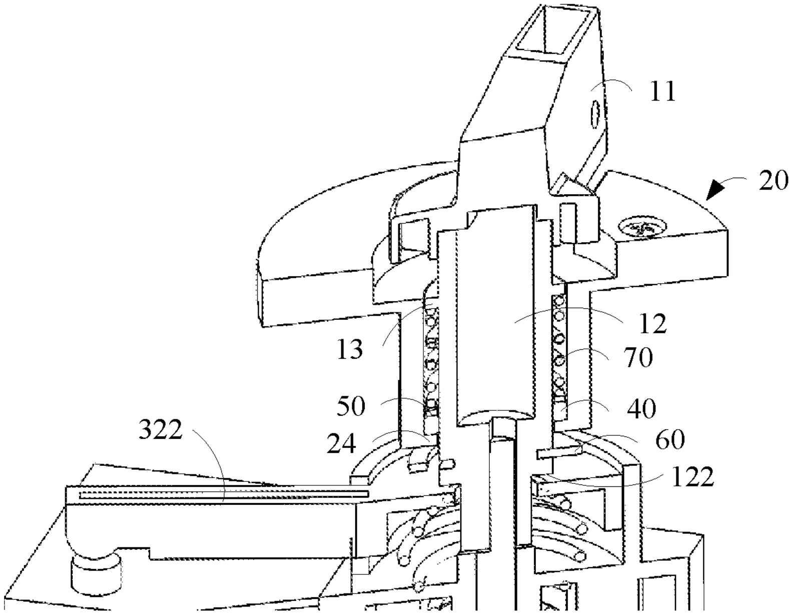
FIG. 5 is a schematic diagram 5 of a structure of a rotary operator according to an embodiment of the present disclosure.
Figure 6:
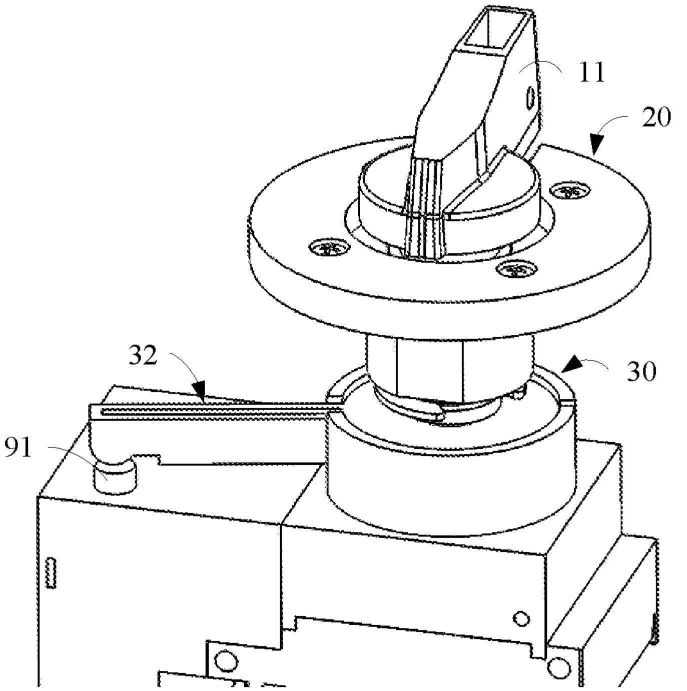
FIG. 6 is a schematic diagram 6 of a structure of a rotary operator according to an embodiment of the present disclosure.

With reference to FIG. 4 to FIG. 6, when the fastening base 20 is divided into two parts, reference may be made to FIG. 4 and FIG. 5. In this case, the pressing component 30 is located between the upper base and the lower base. The pressing component 30 may be accommodated in the lower base. The avoidance slot 22 is disposed on the lower base of the fastening base 20. In this case, when the handle 10 drives the tripper 90 to be reset, the pressing component 30 gradually approaches the lower base of the fastening base 20 until the pressure-bearing component 31 is accommodated in the lower base. In this process, the pressing rod 32 gradually approaches the avoidance slot 22.

In addition, to facilitate detachment of the pressing component 30 from the avoidance slot 22 after the tripper 90 is reset, which enables the handle 10 to be reset, optionally, a spring may be further disposed in the lower base of the fastening base when the fastening base 20 is divided into two parts.

With reference to FIG. 1 and FIG. 11 (which show a corresponding structure when the fastening base 20 is in an integrated type) or FIG. 4 and FIG. 5 (which show a corresponding structure when the fastening base 20 is in a separated type), to keep the pressing component 30 in a stable state when the pressing component 30 moves relative to the fastening base 20, there are optionally two avoidance slots 22. The two avoidance slots 22 are separately disposed on the fastening base 20 (when the fastening base 20 is in the integrated type, refer to FIG. 11 for positions of the avoidance slots 22, and when the fastening base 20 is in the separated type, refer to FIG. 4 for the positions of the avoidance slots 22). The pressing rod 32 includes a first limiting rod 321 and a second limiting rod 322 that are separately connected to the pressure-bearing component 31. The first limiting rod 321 and the second limiting rod 322 are engaged with the two avoidance slots 22 in a one-to-one correspondence. The second limiting rod 322 is configured to be in contact with or be separated from the tripper 90 of the circuit breaker. Further, the first limiting rod 321 and the second limiting rod 322 may be symmetrically disposed on two opposite sides of the pressure-bearing component 31. In this way, when the pressing component 30 moves relative to the fastening base 20, stability of the pressing component 30 can be effectively maintained.

Optionally, the transmission end 12 further includes a baffle 60 connected to an outer peripheral wall of the transmission end 12, and the baffle 60 is configured to restrict the handle 10 from being detached from the accommodation cavity 21. The baffle 60 may be a baffle ring or the like.

It should be noted that, with reference to FIG. 1 to FIG. 3, when the fastening base 20 is an integrated part, the transmission end 12 may further include, other than including the baffle 60, a limiting part 122 that is disposed on the transmission end 12 of the handle 10. The baffle 60 is connected to the outer peripheral wall of the transmission end 12, and is located on a side that is of the limiting part 122 and that is close to the pressing component 30. The pressing component 30 is located between the limiting part 122 and the baffle 60. The baffle 60 and the limiting part 122 jointly function to confine the pressing component 30 axially to the transmission end 12. The limiting part 122 may be a component that is formed on the transmission end 12, so that the component is formed on a side that is of the transmission end 12 and that is close to the pressing component 30. Existence of the baffle 60 and the limiting part 122 enables the pressing component 30 to be confined axially between the limiting part 122 and the baffle 60. In this way, the pressing component 30 can be prevented from being detached from the transmission end 12, and the transmission end 12 can be enabled to apply a downward pressing and driving force to the pressing component 30. It should be understood that the foregoing two manners are merely two examples provided in the present disclosure, and are not intended to limit the present disclosure, provided that the handle 10 is pushed to move along the axis of the accommodation cavity 21, so that the pressing component 30 can move relative to the fastening base 20 to be in contact with the tripper 90 of the circuit breaker to act on the tripper 90, or to be away from the tripper 90 to stop acting on the tripper 90.

In addition, with reference to FIG. 4 to FIG. 6, when the fastening base 20 is divided into two parts, that is, including an upper base and a lower base that are separated from each other, the transmission end 12 may also include the baffle 60. In this way, the baffle 60 may be disposed on the outer peripheral wall of the transmission end 12 of the handle 10, and is located between the upper base and the lower base.

The baffle 60 may be configured to restrict the handle 10 from moving along an axis direction of the handle 10, so that the handle 10 is not detached from the upper base from the accommodation cavity 21.

Optionally, to push the handle 10 more easily to move along the axis of the accommodation cavity 21, in this embodiment, the handle 10 further includes a driving end 11 connected to the transmission end 12, and the driving end 11 is configured to be manually held to drive the transmission end 12 to move.

In addition, to improve sealing performance of a cabinet by forming a sealed connection between the rotary operator and a machine, in this embodiment, a sealing ring 40 is sleeved on the outer peripheral wall of the transmission end 12, and the sealing ring 40 is located between the transmission end 12 and the fastening base 20. Further, to make sealing performance better, optionally, a gasket 50 is further sleeved on the outer peripheral wall of the transmission end 12, and the gasket 50 is located on a side that is of the sealing ring 40 and that is away from the pressing component 30.

In addition, in an embodiment of the present disclosure, the rotary operator may further include a fastening nut 80. A thread is correspondingly disposed on an outer peripheral wall of the fastening base 20. The fastening nut 80 is screwed to the fastening base 20. In this way, the rotary operator may be fastened to a cabinet as a whole by using the fastening nut 80.

Figure 12:
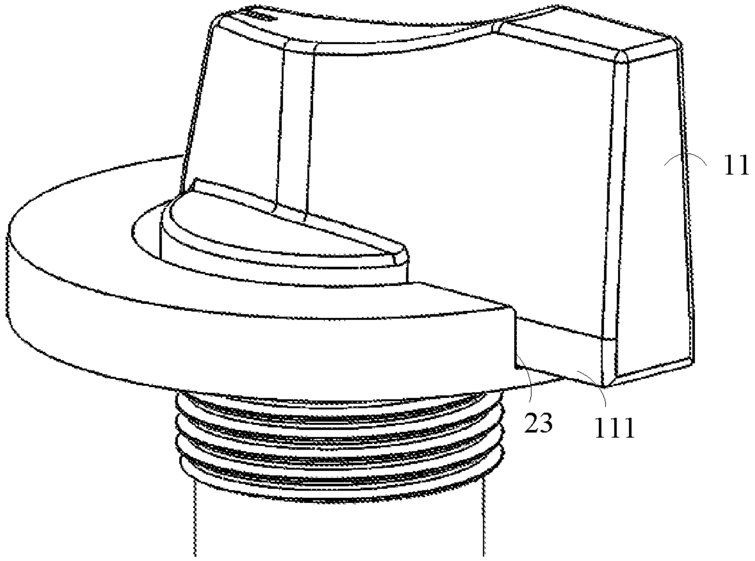
FIG. 12 is a diagram 1 of a cooperative relationship between a limiting component and a limiting groove according to an embodiment of the present disclosure.
Figure 13:
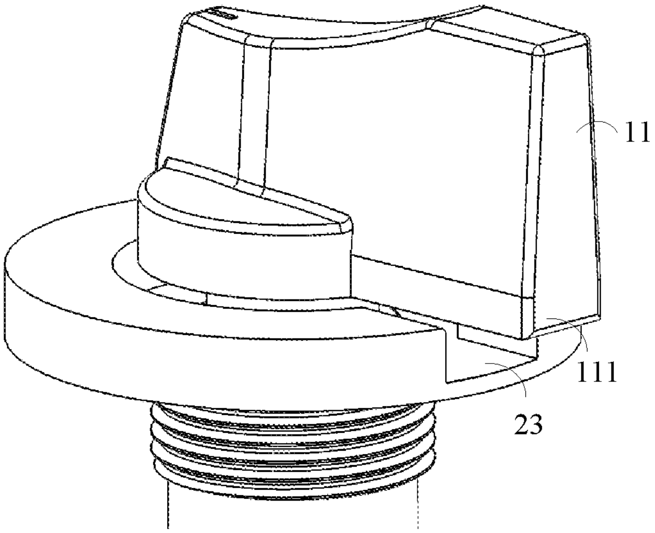
FIG. 13 is a diagram 2 of a cooperative relationship between a limiting component and a limiting groove according to an embodiment of the present disclosure.

With reference to FIG. 12 and FIG. 13, optionally, a limiting groove 23 is disposed on a side that is of the fastening base 20 and that is close to the handle 10 (which may be, for example, on the driving end 11 of the handle 10). The handle 10 (or the driving end 11 when the limiting groove 23 is on the driving end 11 of the handle 10) is provided with a limiting component 111 corresponding to the limiting groove 23. When the handle 10 is pushed to drive the pressing component 30 move toward the tripper 90, the limiting component 111 is engaged with the limiting groove 23. In this way, when the pressing component 30 is required to be driven to acts on the tripper 90, the limiting component 111 may move toward the limiting groove 23 from an upper part of the limiting groove 23. When the limiting component 111 is engaged with the limiting groove 23, the pressing component 30 acts on the tripper 90 to reset the tripper 90. When the transmission end 12 of the handle 10 is required to be driven to rotate so that the transmission end 12 cooperates with the circuit breaker to implement switching-off or switching-on, after the pressing component 30 drives the tripper 90 to be reset, the limiting component 111 of the handle 10 may be first detached from the limiting groove 23, and then the handle 10 is driven to rotate.

With reference to FIG. 2 and FIG. 3, after the pressing component 30 acts on the tripper 90 to drive the tripper 90 to be reset, for ease of enabling the pressing component 30 and the handle 10 to be reset, optionally, the rotary operator further includes an elastic component 70. The elastic component 70 acts between the fastening base 20 and the handle 10, and is configured to drive the handle 10 to move along the axis of the accommodation cavity 21 to generate a movement trend of being detached from the accommodation cavity 21. It should be understood that a function of the elastic component 70 is to drive the handle 10 to be quickly reset.

For example, in an embodiment, to facilitate fastening of the elastic component 70, the fastening base 20 is further provided with a first protrusion 24 extending toward the handle 10 from an inner wall of the accommodation cavity 21. The handle 10 further includes a second protrusion 13. The second protrusion 13 is disposed on an outer peripheral wall of the handle 10. One end of the elastic component 70 abuts against the first protrusion 24, and the other end abuts against the second protrusion 13. For example, there may be two elastic components 70. The two elastic components 70 are symmetrically disposed on two opposite sides of the transmission end 12 of the handle 10. One end of the elastic component 70 abuts against the first protrusion 24, and the other end abuts against the second protrusion 13. Alternatively, the elastic component 70 may be a spring. In this way, the spring may be sleeved on the outer wall of the transmission end 12 of the handle 10. One end of the spring abuts against the first protrusion 24, and the other end abuts against the second protrusion 13.

In addition to the foregoing manner of designing the pressing component 30 into a form of a connecting rod to drive the reset button 91 to perform reset, in the present disclosure, the handle 10 may be rotated, and then the handle 10 is enabled to drive the pressing component 30, so that the pressing component 30 acts on the reset button 91, and the reset is implemented by using the reset button 91. Alternatively, the pressing component 30 may be configured as a lever structure to implement the reset by using the reset button 91. The present disclosure includes all implementations in which the handle 10 may be operated, so that the handle 10 drives the pressing component 30, and the pressing component 30 is driven to act on the reset button 91 and the reset button 91 performs the reset. The following uses an example in which the pressing component 30 is configured as the lever structure to implement the reset by using the reset button 91 for description.

To simplify a structure, when the pressing component 30 is configured as the lever structure to implement the reset by using the reset button 91, in the present disclosure, only a lever support is required to be added at a corresponding position based on the first embodiment. For example, the rotary operator further includes a lever support. The lever support and the pressing rod 32 are connected to each other to jointly form a lever structure. The handle 10 is pushed to move along the axis of the accommodation cavity 21 to act on the pressure-bearing component 31, so that the pressing component 30 is in contact with or is separated from the tripper 90 of the circuit breaker under action of the lever support.

For example, the lever support may be fastened to a housing of the circuit breaker, which is not specifically limited. A person skilled in the art may properly select a fastening position of the lever support based on an actual situation.

In addition, the lever support may abut against, or may be hinged to the pressing rod 32, which is not limited in the present disclosure, provided that the lever support and the pressing rod 32 can form a lever structure. However, to ensure connection reliability of the lever structure, hinged connection may be preferred in a practical operation.

An action point between the tripper 90 (or the reset button 91, and the reset button 91 is used as an example below for description) and the pressing rod 32, and an action point between the handle 10 and the pressure-bearing component 31 are all located on a same side of the lever support. In this way, in a use process, the handle 10 may be pushed to move along the axis of the accommodation cavity 21, so that a downward action force of pressing the handle 10 is applied to the pressure-bearing component 31. Because the pressure-bearing component 31 and the reset button 91 are located on the same side of the lever support, the pressing rod 32 may be driven to act on the reset button 91, so that the reset button 91 performs reset.

Alternatively, an action point between the reset button 91 and the pressing rod 32 and an action point between the handle 10 and the pressure-bearing component 31 are located on a same side of the lever support. For example, the action point between the reset button 91 and the pressing rod 32 may be located between the lever support and the action point between the handle 10 and the pressure-bearing component 31. Alternatively, the action point between the handle 10 and the pressure-bearing component 31 may be located between the lever support and the action point between the reset button 91 and the pressing rod 32. A specific configuration manner is not specifically limited in the present disclosure. A person skilled in the art may select a proper configuration manner based on an actual requirement, provided that a lever structure can be formed and the reset button 91 can be driven to perform reset under a pressing action of the handle 10.

In addition, the handle 10 may also be pulled up so that the handle 10 moves upward along the axis of the accommodation cavity 21, thereby controlling the reset button 91 to perform the reset.

According to another aspect of the present disclosure, a rotary switch is provided. The rotary switch includes a tripper 90 and the foregoing rotary operator. The rotary operator is configured to act on the tripper 90 to reset the tripper 90. The rotary switch can easily enable the tripper 90 of a circuit breaker to be reset after a switching operation is completed. Because the structure of the rotary operator and beneficial effects thereof are described in detail above, details are not described herein again.

Figure 7:
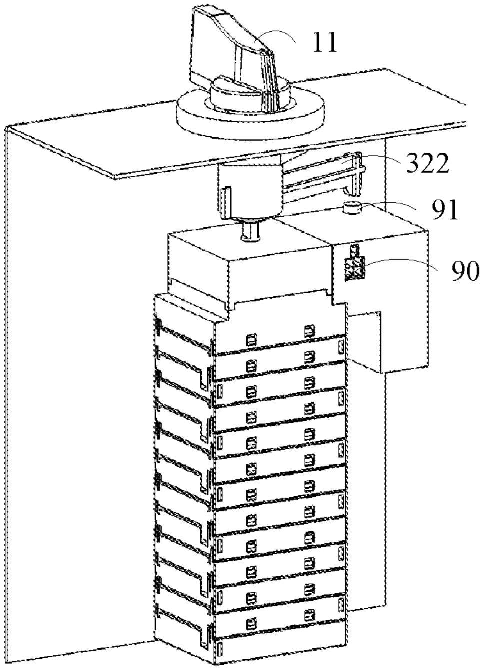
FIG. 7 is a diagram 1 of a cooperative relationship between a rotary operator and a circuit breaker according to an embodiment of the present disclosure.
Figure 8:
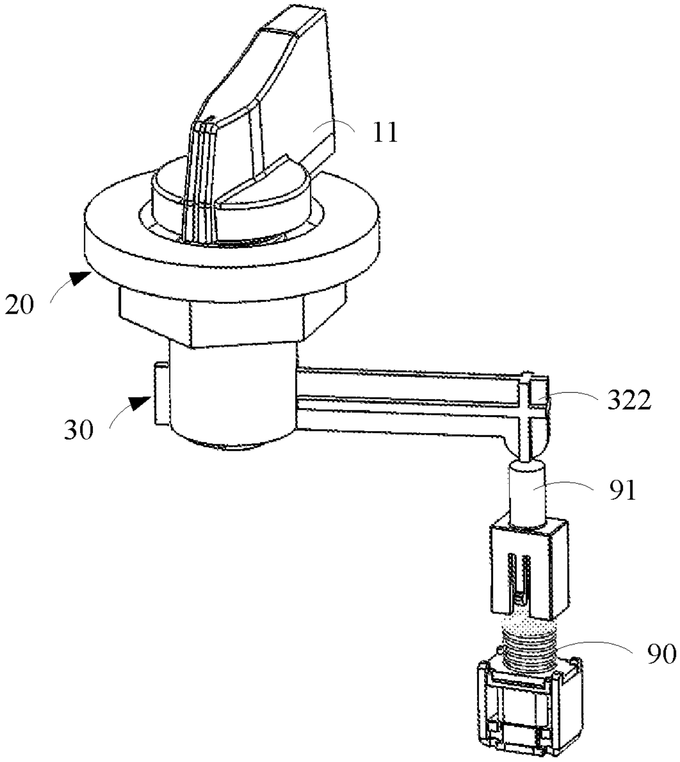
FIG. 8 is a diagram 2 of a cooperative relationship between a rotary operator and a circuit breaker according to an embodiment of the present disclosure.

It should be noted that, the tripper 90 may further include the reset button 91. With reference to FIG. 7 and FIG. 8, the reset button 91 is configured to reset the tripper 90. In this way, in this embodiment, the reset of the tripper 90 can be controlled provided the rotary operator acts on the reset button 91.

The foregoing descriptions are merely optional embodiments of the present disclosure, but are not intended to limit the present disclosure. For a person skilled in the art, the present disclosure may have various modifications and variations. Any modification, equivalent replacement, or improvement made without departing from the principle of the present disclosure shall fall within the protection scope of the present disclosure.

In addition, it should be noted that the specific technical features described in the foregoing specific implementations may be combined in any proper manner when no contradiction exists. To avoid unnecessary repetition, various possible combination manners are not further described in the present disclosure.

What is claimed is:

1. A rotary operator, comprising:
a handle;
a fastening base; and
a pressing component,
wherein:
the fastening base is provided with an accommodation cavity;
a transmission end of the handle is inserted into the accommodation cavity and is capable of relatively rotating in the accommodation cavity;
the pressing component is sleeved on the transmission end of the handle and is slidably connected to the fastening base; and
the handle is pushed to move along an axis of the accommodation cavity, so that the pressing component moves relative to the fastening base to be in contact with or separated from a tripper; and
wherein:
the pressing component comprises a pressure-bearing component and a pressing rod,
the pressure-bearing component is sleeved on the transmission end of the handle,
the fastening base is provided with an avoidance slot fitting the pressing rod,
one end of the pressing rod is connected to the pressure-bearing component,
another end of the pressing rod is arranged to extend through the avoidance slot outward; and
the pressing rod is configured to act on the tripper.

2. The rotary operator according to claim 1, wherein:
the rotary operator further comprises a lever support;
the lever support and the pressing rod are connected to each other to jointly form a lever structure; and
the handle is pushed to move along the axis of the accommodation cavity to act on the pressure-bearing component, so that the pressing component is in contact with or separated from the tripper of a circuit breaker under an action of the lever support.

3. The rotary operator according to claim 1, wherein:
the fastening base is provided with two avoidance slots including the avoidance slot fitting the pressing rod;
the two avoidance slots are separately disposed on the fastening base;
the pressing rod comprises a first limiting rod and a second limiting rod that are separately connected to the pressure-bearing component;
the first limiting rod and the second limiting rod are engaged with the two avoidance slots in a one-to-one correspondence; and
the second limiting rod is configured to be in contact with or separated from the tripper of a circuit breaker.

4. The rotary operator according to claim 1, wherein the handle further comprises a driving end connected to the transmission end, and the driving end is configured to be held by a hand.

5. The rotary operator according to claim 1, wherein the transmission end further comprises a baffle connected to an outer peripheral wall of the transmission end, and the baffle is configured to restrict the handle from being detached from the accommodation cavity.

6. The rotary operator according to claim 1, wherein a limiting groove is disposed on a side that is of the fastening base and that is away from the pressing component, a limiting component is disposed on the handle corresponding to the limiting groove, and when the handle is pushed to drive the pressing component to move toward the tripper, the limiting component is engaged with the limiting groove.

7. A rotary operator, comprising:
a handle;
a fastening base; and
a pressing component,
wherein:
the fastening base is provided with an accommodation cavity;
a transmission end of the handle is inserted into the accommodation cavity and is capable of relatively rotating in the accommodation cavity;
the pressing component is sleeved on the transmission end of the handle and is slidably connected to the fastening base; and the handle is pushed to move along an axis of the accommodation cavity, so that the pressing component moves relative to the fastening base to be in contact with or separated from a tripper;

wherein the rotary operator further comprises an elastic component that acts between the fastening base and the handle, and is configured to drive the handle to move along the axis of the accommodation cavity to generate a movement trend of being detached from the accommodation cavity; and wherein:

the fastening base is further provided with a first protrusion extending toward the handle from an inner wall of the accommodation cavity, the handle further comprises a second protrusion, the second protrusion is disposed on an outer peripheral wall of the handle, one end of the elastic component abuts against the first protrusion, and another end of the elastic component abuts against the second protrusion.

8. A rotary switch, comprising:

a tripper; and a rotary operator, wherein the rotary operator is configured to act on the tripper to reset the tripper;

wherein the rotary operator comprises:

a handle;

a fastening base; and a pressing component, wherein:

the fastening base is provided with an accommodation cavity;

a transmission end of the handle is inserted into the accommodation cavity and is capable of relatively rotating in the accommodation cavity;

the pressing component is sleeved on the transmission end of the handle and is slidably connected to the fastening base; and the handle is pushed to move along an axis of the accommodation cavity, so that the pressing component moves relative to the fastening base to be in contact with or separated from a tripper; and wherein:

the pressing component comprises a pressure-bearing component and a pressing rod, the pressure-bearing component is sleeved on the transmission end of the handle, the fastening base is provided with an avoidance slot fitting the pressing rod, one end of the pressing rod is connected to the pressure-bearing component, another end of the pressing rod is arranged to extend through the avoidance slot outward; and the pressing rod is configured to act on the tripper.

9. The rotary switch according to claim 8, wherein:

the rotary switch further comprises a lever support;

the lever support and the pressing rod are connected to each other to jointly form a lever structure; and the handle is pushed to move along the axis of the accommodation cavity to act on the pressure-bearing component, so that the pressing component is in contact with or separated from the tripper of a circuit breaker under an action of the lever support.

10. The rotary switch according to claim 8, wherein:

the fastening base is provided with two avoidance slots including the avoidance slot fitting the pressing rod;

the two avoidance slots are separately disposed on the fastening base;

the pressing rod comprises a first limiting rod and a second limiting rod that are separately connected to the pressure-bearing component;

the first limiting rod and the second limiting rod are engaged with the two avoidance slots in a one-to-one correspondence; and the second limiting rod is configured to be in contact with or separated from the tripper of a circuit breaker.

11. The rotary switch according to claim 8, wherein the handle further comprises a driving end connected to the transmission end, and the driving end is configured to be held by a hand.

12. The rotary switch according to claim 8, wherein the transmission end further comprises a baffle connected to an outer peripheral wall of the transmission end, and the baffle is configured to restrict the handle from being detached from the accommodation cavity.

13. The rotary switch according to claim 8, wherein a limiting groove is disposed on a side that is of the fastening base and that is away from the pressing component, a limiting component is disposed on the handle corresponding to the limiting groove, and when the handle is pushed to drive the pressing component to move toward the tripper, the limiting component is engaged with the limiting groove.

14. A rotary switch, comprising:

a tripper; and a rotary operator, wherein the rotary operator is configured to act on the tripper to reset the tripper;

wherein the rotary operator comprises:

a handle;

a fastening base; and a pressing component, wherein:

the fastening base is provided with an accommodation cavity;

a transmission end of the handle is inserted into the accommodation cavity and is capable of relatively rotating in the accommodation cavity;

the pressing component is sleeved on the transmission end of the handle and is slidably connected to the fastening base; and the handle is pushed to move along an axis of the accommodation cavity, so that the pressing component moves relative to the fastening base to be in contact with or separated from a tripper;

wherein the rotary switch further comprises an elastic component that acts between the fastening base and the handle, and is configured to drive the handle to move along the axis of the accommodation cavity to generate a movement trend of being detached from the accommodation cavity; and wherein:

the fastening base is further provided with a first protrusion extending toward the handle from an inner wall of the accommodation cavity, the handle further comprises a second protrusion, the second protrusion is disposed on an outer peripheral wall of the handle, one end of the elastic component abuts against the first protrusion, and another end of the elastic component abuts against the second protrusion.

* * * * *